Oct. 18, 1938.  J. M. WHELTON  2,133,314
APPARATUS FOR ASSEMBLING SHOE PARTS
Filed March 26, 1937  2 Sheets-Sheet 1

INVENTOR
John M. Whelton
By his Attorney
Victor Cobb

Oct. 18, 1938. J. M. WHELTON 2,133,314

APPARATUS FOR ASSEMBLING SHOE PARTS

Filed March 26, 1937 2 Sheets-Sheet 2

INVENTOR
John M. Whelton
By his Attorney
Victor Coll

Patented Oct. 18, 1938

2,133,314

UNITED STATES PATENT OFFICE 2,133,314

APPARATUS FOR ASSEMBLING SHOE PARTS

John M. Whelton, Peabody, Mass., assignor to United Shoe Machinery Corporation, Paterson, N. J., a corporation of New Jersey Application March 26, 1937, Serial No. 133,229

9 Claims. (Cl. 12—17)

This invention relates to apparatus for assembling shoe parts preparatory to an operation by which said parts will be molded and/or secured together. While the invention is illustrated with reference to the assembling of the component parts of an insole unit or so-called "reinforced insole" and more particularly of an insole or insole unit having a non-symmetrical edge contour in its shank portion, it is to be understood that the invention and various important features thereof may have other applications and uses.

Letters Patent of the United States No. 2,083,583, granted June 15, 1937, upon an application filed in my name, there is disclosed, in conjunction with a molding machine, special mechanism for assembling the parts of insoles of regular shape and also of those with unusually narrow shank portions. It is an object of this invention to provide a device which, while useful in assembling the parts of insoles (or insole units) having symmetrical shank portions, is especially adaptable to the assembling of the parts of insoles the shank portions of which are non-symmetrical, such as insoles of the type in which a lateral extension or "wing" is provided at the inside shank portion of the insole for supporting the inner longitudinal arch of the foot, such insoles being commonly known as wing or "cookie" insoles.

Accordingly, the invention provides gaging or positioning means, useful in assembling parts of insole units, wherein provision is made for changing the ratio of movement of gaging or positioning members which locate the insole parts upon a support such, for example, as a block or form for use in molding the insole, it being understood that irregularly shaped insoles of the wing type will be positioned non-symmetrically on the support, i. e., with a greater portion of the insole located on one side of the longitudinal median line of the support than on the other side thereof. It follows that in positioning such type of insole on the support one gaging or positioning member should move substantially farther than the other in the same time, i. e. faster, in engaging opposite edges of such insole member. Conveniently, and as shown, the gaging or positioning members are connected together for simultaneous movement by extensions on said members in juxtaposed relation to each other, a slidable connection being provided between the extensions for adjustment to vary the ratio of movements of the gaging or positioning members.

In the illustrated construction, the above-mentioned extensions are slotted and are connected by a slidable coupling pin member adapted to be secured to one of the extensions after adjustment to a position such that the gage members will have a predetermined ratio of movement relative to each other to secure assembling of a given type of wing insole, the arrangement being such that a corresponding adjustment of the coupling pin member in the opposite direction will condition the gage members for movement in assembling operations on a right insole of the wing type if the parts have previously been set for a left insole of the wing type, or vice versa.

Conveniently and as illustrated herein, there is provided in connection with the coupling pin member a scale and a pointer or indicator for enabling the operator to duplicate, that is to repeat, settings of the coupling member and hence of the gage members in assembling operations upon various types of insoles.

These and other important features of the invention and novel combinations of parts will now be described in detail in the specification and then pointed out more particularly in the appended claims.

Figure 6:
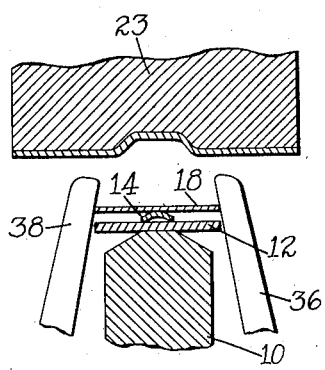
Fig. 6 is a transverse vertical section through the work support and insole members of Fig. 5 showing, more clearly, the manner of assembling the various portions of an insole.
Figure 7:
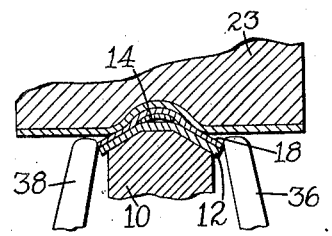
Fig. 7 is a view similar to Fig. 6 showing the parts in different relationship.
Figure 8:
Fig. 8 is a transverse section of the completed insole.

In the illustrated device, which is specially designed for use in assembling parts or members of an insole unit, and particularly of an insole of the type commonly referred to as a wing insole, there is provided a work support in the form of a block 10 the upper surface of which has various portions thereof shaped in a manner corresponding to the similar portions of a certain style of last. This is most desirable since the illustrated device is utilized in conjunction with means for molding insole parts to a predetermined shape to adapt them to conform to the shape of a last upon which shoe parts, including an insole, may be assembled. Upon the block 10 there is first located an insole member 12 by means to be described herein. There is then placed upon the insole member 12 a shank stiffener 14, the latter being located by an end gage member 16 and two side gage members 17 (Fig. 1), as described in detail in my said copending application. Finally there is placed upon the shank stiffener 14 a reinforcing piece 18. It will be understood that the insole member 12 and the reinforcing piece 16 will have had a suitable adhesive applied to certain portions thereof so that, upon application of pressure upon the assembled parts, these will be caused to adhere to each other to produce a unitary structure. For this purpose also, the shank stiffener 14 is provided with one or more spurs at 20 to assist in securing it in place. Preferably, and as indicated, the forward end of the reinforcing piece 18 is provided with a notch at 22 which is offset from the median line of the reinforcing piece and is adapted to engage the forward end of the shank stiffener 14 whereby the reinforcing piece may be readily positioned with respect to said shank stiffener and the insole member 12. As clearly indicated in Figs. 6 and 7, a presser member 23 co-operates with the block 10 in a molding operation upon the insole parts assembled on the said block during which the said parts become secured to each other.

Figure 1:
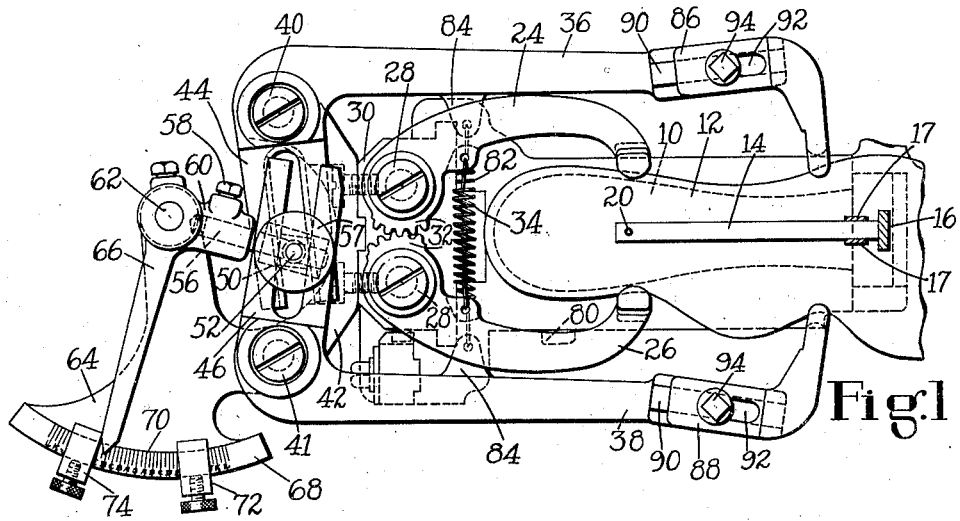
Fig. 1 is a plan view of a work supporting and assembling device particularly useful in assembling the parts of a right insole of the wing type.
Figure 2:
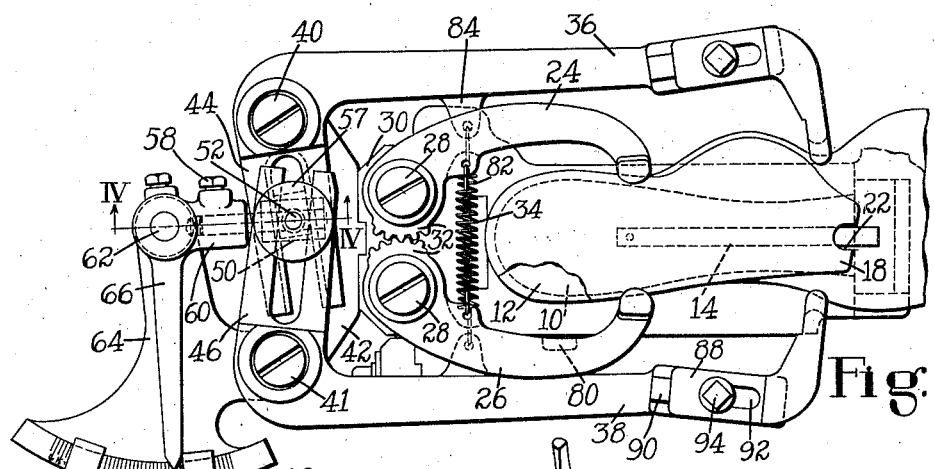
Fig. 2 is a view similar to Fig. 1 showing the relationship of the parts in locating a left insole of wing type.

In order that the insole member 12 may be accurately positioned upon the block 10, and particularly in those cases wherein the insole is so shaped that a larger portion thereof lies to one side of the median line of the block as in the case of a wing insole shown in Figs. 1 and 2 of the drawings, there are provided pairs of gage members or positioning jaws to engage opposite edge portions of the insole member 12. It may be noted in passing that the reinforcing member 18, instead of the insole member 12, may have the wing extension, in which case the member 18 will be subjected to positioning operations by the gage members. Of these positioning jaws, a shorter pair 24, 26 is so mounted as to engage the heel portion of the insole. As shown, these gage or jaw members 24, 26 are mounted rotatably upon fulcrum studs 28 carried by a vertically movable block or carriage 30. Preferably, and as shown, the gage members 24, 26 are provided with integral segments 32 carrying gear teeth which intermesh, the arrangement being that the gage members 24 and 26 must move to an equal extent and in opposite directions. Connected to the gage members 24 and 26 is a spring 34 constantly tending to move and hold the forward ends of the gage or jaw members toward each other and in engagement with side edges of an insole member 12 on the block 10.

For co-operation with the positioning jaws 24 and 26 in positioning an insole on the block 10, there is provided a longer pair of gage members or positioning jaws 36, 38 rotatably mounted upon fulcrum studs 40, 41, respectively, carried by a block 42 rigidly secured to the block or carriage 30. In order that the gage or jaw members 36, 38 will be constrained to move at the same time and in opposite directions, the said members are provided with slotted extensions 44, 46, respectively, arranged to overlap each other and to be connected together by a slidable connection in the form of a coupling pin member slidably engaged in said slotted extensions 44, 46.

Figures 3, 4:
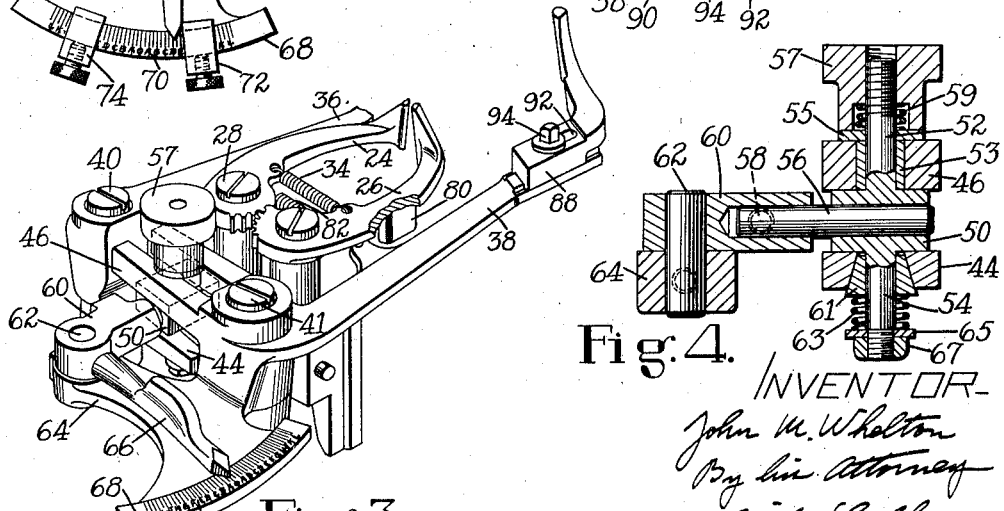
Fig. 3 is a perspective view of some of the parts shown in Figs. 1 and 2, illustrating more clearly certain features of the mechanism.
Fig. 4 is a sectional view along the line IV—IV of Fig. 2, looking in the direction of the arrows.

As shown, the coupling pin member comprising a block 50 (Figs. 3 and 4) having integrally formed therewith oppositely extending pins 52, 54, the pin 52 carrying a collar 53 and being slidable along the slot of the extension 46 of the gage or jaw 38. It will be understood that the collar 53 has a length dimension on the pin 52 which is slightly less than the thickness dimension of the extension 46. Also carried by the pin 52 is a washer 55, and a thumb nut 57 having a screw threaded socket for engagement with a correspondingly screw threaded portion of the pin 52. Hence, upon screwing the thumb nut 57 down firmly against the washer 55, the pin 52 is held in adjusted position in the slot of the extension 46 of the gage or jaw 38. Conveniently a spring 59 serves to prevent too free movement of the thumb nut 57 upon the pin 52 and to provide suitable friction between the relatively slidable parts, thereby facilitating nice adjustment of the parts. As shown, the pin 54 of the coupling pin member is slidable along the slot in the extension 44 of the gage or jaw 36, a slide member 61 being positioned in engagement with the base of the pin 54 and with the sides of the slot in the jaw extension 44 to maintain operative engagement of the pin 54 with said jaw extension 44. Preferably, the sides of the slot in the jaw extension 44 are inclined as shown in Fig. 4 and the slide member 61 is held yieldingly in proper engagement with the inclined sides of the slot by means of a spring 63 backed by a washer 65 and an adjustable nut 67. It will be clear that while the jaw extension 46 may be clamped to the pin 52 and hence be rigidly held in fixed relation to the block 50, the other gage or jaw member 36 together with its extension 44 is at all times movable with respect to the block 50, since the member 61 is not only slidable in the extension 44 but is also pivotally movable on the pin 54. It is to be understood, however, that both gage or jaw members 36 and 38 are at all times free to turn about their fulcrum studs 40, 41, respectively, as will be hereinafter more fully explained.

The block 50 of said coupling pin member is slidably mounted upon a pin 56 (Figs. 1 to 4, inclusive) secured by a set screw 58 within a socket in a member 60 pivotally mounted upon a fulcrum stud 62 rigidly carried by a bracket 64 integrally formed with the jaw member 38 in offset relation to the latter as most clearly shown in Fig. 3. Rigidly secured to the member 60 is a pointer or indicator lever 66, the free end of which is adapted to move along above an arcuate member 68 rigid with the bracket 64 and provided with a scale 70, so that settings of the jaw or gage members 36, 38 with respect to each other may be duplicated, i. e., repeated whenever desired. As shown, the arcuate member 68 has slidably engaged therewith two stop members 72, 74 located on opposite sides of the end of the pointer 66. It will be readily understood, upon inspection of Figs. 1, 2 and 3, that movement of the pointer 66, when the thumb nut 57 is loose, causes a corresponding movement of the coupling pin member along the slotted extensions 44, 46 of the gage or jaw members 36, 38. Movement of the pointer 66 and of the associated coupling pin member is for the purpose of adjusting the ratio of relative movements of the gages or positioning jaws 36, 38. After adjustment, the thumb nut 57 is tightened thereby providing for a substantially predetermined ratio of movement of the jaws 36 and 38 until a change of ratio is desired. Since the block member 61 slides away from and toward the fulcrum stud 40 as the gage or jaw member 36 is moved away from and toward the gage or jaw member 38, the ratio of movement of the gage or jaw members is not simple but is complicated by the shifting of the member 61. However, this undesired effect is negligible from the practical standpoint and is more than compensated for by the simplicity of the construction and the ease with which it may be manipulated.

With respect to the scale 70 it may be stated that the graduations of the scale are made up of equally spaced lines and that the desired setting of the stop members 72, 74 is secured by actually assembling different types of insoles on different block members (10) corresponding to various lasts. For example, the wing insole shown in Fig. 1 is placed in proper position on the block 10 by an expert in this work, who notes the reading of the pointer 66 on the scale 70. In the present instance this reading is D—½, meaning one-half space beyond the D line, it being understood that this is the reading of this particular wing insole on a certain block 10 corresponding to a certain style of last. This same insole placed on a block (10) corresponding to a different style of last might require the pointer 66 to be set at L—1, that is, one space after the L line. It is to be clearly understood that the readings on the scale 70 have nothing to do with size. As a matter of fact, all sizes of wing insoles of the style shown in Fig. 1, will have the same setting of the pointer 66 with respect to the scale 70. Having assembled different types of insoles successively upon blocks 10 of different types corresponding to various lasts, and having kept a record thereof, the expert will make a chart for the guidance of the operator working with this mechanism, so that duplicate, i. e. repeat settings of the pointer and hence of the gage or positioning members 36, 38 may be readily made by the operator without experimentation.

To facilitate positioning an insole member 12 upon the block 10, the short positioning jaw 26 is provided with a downwardly projecting stud 80 (Figs. 1, 2 and 3) so that, after a certain amount of outward movement of the jaw 26, the gage or jaw 38 will be contacted by said stud 80 and hence will be carried along in the outward movement of the jaw 26 under pressure of the hand of the operator. As already pointed out, such movement of the gage or jaw 26 is accompanied by a corresponding movement of the gage or jaw 24 due to the intermeshing teeth on the segments 32. Outward movement of the gage member or jaw 38 away from the block 10 is accompanied also by movement of the gage or jaw 36 in a direction away from said block, it being clear that outward movement of the jaw 38 about the fulcrum point 41 is accompanied by a forward swinging movement of its slotted extension 46. Because of the coupling pin member engaged in the slots of the extensions 44 and 46, the extension 44 accompanies the movement of the extension 46. Hence, the positioning jaw 36 also moves outwardly away from the block 10 upon such movement of the jaw 38, the extent of the movement of the jaw 36 being variable and dependent upon the positioning of the coupling pin member in the slot of the extension 44. The positioning jaws 36 and 38 will be returned, after a separating movement, to work engaging position by a spring 82 having its ends connected to brackets 84 extending inwardly from the said jaws.

From the preceding description it is clear that the positioning jaw or gage 36 may turn freely about its fulcrum stud 40 because of the sliding engagement of its extension 44 on the pin 54 of the coupling pin member. Furthermore, since the bracket 64, which carries the pivot 62, is integral with the jaw 38, it follows that the bracket 64, the pivot pin 62, the coupling pin comprising the block 50, the jaw extension 46, and the jaw 38 will all move as one unitary member about the fulcrum point 41, when the nut 57 is tightened to secure the jaw extension 46 to the block 50.

Conveniently, and as shown, the forward work engaging ends of the positioning jaw members 36, 38 are carried by members 86, 88 adjustably mounted on the jaw members 36, 38, respectively. As illustrated, the members 86, 88 have body portions in the form of slide blocks each engaging a rib 90 on the corresponding jaw and each having a slot 92 through which passes a clamp screw 94 to hold the respective member 86 or 88 in adjusted positions on the jaw 36 or 38.

In locating wing insole parts on the work support or block 10, it will be observed that the outside edge of both the right and the left insole is nearer to the adjacent edge of the block and to the shank stiffener than is the inside edge of the same insole. In other words, a wing insole is non-symmetrically placed upon the block 10, as will be clearly understood upon comparing the position of the insole with that of the shank stiffener which, in all cases, is located along the longitudinal median line of the block 10. It follows that the longer pair of positioning jaws 36, 38 must be given an initial non-symmetrical setting with respect to the median line of the block 10. However, this setting of the jaws 36 and 38 does not disturb the symmetrical setting of the shorter positioning jaws 24, 26. It follows that the longer positioning jaws 36 and 38 effect the proper position, i. e., skewing of the wing insole without causing appreciable offsetting of the centers of the heel portions of these insoles. In making use of the device shown in Figs. 1 and 2 of the drawings, the nut 57 will be loosened and the pointer 66 will be moved against the stop 74 in proper position in Fig. 1 to locate a right wing insole of a certain type on the support 10. Then the nut 57 will be screwed down to maintain the setting of the longer positioning jaws 36, 38 thus obtained. For a left wing insole the jaws 36, 38 must be thrown over to the other side. Hence, the nut 57 is loosened and the pointer is moved into position against the stop 72 which has been set as far to the right of the zero mark on the scale 70 as the stop 74 is to the left of said zero mark. Again, the nut 57 is screwed down and the device is set for assembling the parts of left wing insoles. In the setting shown in Fig. 1, the positioning jaw 36 in moving to operative position, after the jaws 36, 38 have been separated to permit the positioning of the wing insole on the support 10, moves faster and farther in arriving at its operative position than does the other jaw 38. By the setting in Fig. 2, the ratio of movement of the jaws 36, 38 has been changed so that now the positioning jaw 38 moves the faster and the farther in arriving at locating position for the left insole.

Figure 5:
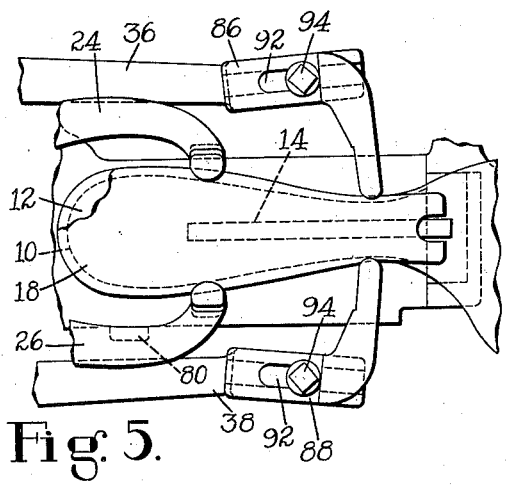
Fig. 5 is a view similar to Figs. 1 and 2 but showing parts adjusted for an insole of still another shape.

Should it be desired to employ the device shown in Figs. 1 and 2 in the assembling of regular insoles, the pointer 66 will be positioned at zero point on the indicator scale before tightening up the nut 57. Thereafter, the longer positioning jaws or gages 36, 38 will move equally in opposite directions just as do the jaws 24, 26. The only other change necessary in the device to enable it to operate upon regular insoles is to shorten the lengths of the arms 36 and 38 by shoving the blocks 86, 88 to their extreme rear positions, respectively, as shown in Fig. 5, and then retightening the clamp screws 94. This will bring the ends of the positioning jaws 36, 38 opposite a narrow part of the shank of the insole.

Assembling of insole member 12 upon the support 10 is accomplished by pulling outwardly on the gage member 26 to move all of the gage or positioning members 24, 26, 36, 38 to open or work receiving position. The insole member 12 is then placed on the support 10 after which the gage members are allowed to return to operative or work engaging position through manually controlled return of gage member 26 to its work engaging position. In this movement of the gaging or positioning members, the insole member 12 is properly positioned on the support 10.

Having described my invention, what I claim as new and desire to secure by Letters Patent of the United States is:

1. In apparatus for use in assembling shoe parts, a support for a shoe part, means for locating the shoe part relatively to said support, said means comprising two gage members, said gage members being located at opposite sides of said shoe part and being movable toward each other to engage said part, and connecting means between said gage members constructed and arranged to constrain said members to move toward each other simultaneously, said connecting means comprising a single member connected to both gage members and adjustable to vary the ratio of the movements of said gage members.

2. In apparatus for use in assembling shoe parts, means for supporting and operating upon a shoe part, and means for locating the shoe part relatively to said supporting and operating means, said locating means comprising two gage arms located at opposite sides of the shoe part, said gage arms being pivotally mounted and having extensions arranged in juxtaposed relation to each other, and a slidable connection between said extensions adapted for adjustment to vary the ratio of the movements of said gage arms.

3. In apparatus for use in assembling shoe parts, means for supporting and operating upon a shoe part, and means for locating the shoe part relatively to said supporting and operating means, said locating means comprising two gage arms located at opposite sides of the shoe part, said gage arms being pivotally mounted and having extensions arranged in juxtaposed relation to each other, a slidable connection between said extensions adapted for adjustment to vary the ratio of the movements of said gage arms, and means for retaining said connection in different adjusted positions.

4. In apparatus for assembling shoe parts, a support upon which the parts are to be assembled, a pair of positioning jaws fulcrummed for pivotal movement toward and from said support, said jaws having overlapping slotted extensions, a slidable connection located in the slots of said extensions and movable in said slots to adjust the said positioning jaws relatively to each other, and means to secure said slidable connection to one of said slotted extensions to maintain a predetermined setting of the positioning jaws relatively to each other.

5. In apparatus for assembling shoe parts, a support upon which the parts are to be assembled, a pair of positioning jaws fulcrummed for pivotal movement toward and from said support, said jaws having overlapping slotted extensions, a slidable connection located in the slots of said extensions and movable in said slots to adjust the said arms relatively to each other, means to secure said slidable connection to one of said slotted extensions to maintain a predetermined setting of the positioning jaws, a scale, and a pointer connected to said slidable connection and movable over said scale, said scale and pointer enabling the operator to duplicate settings of the positioning jaws.

6. In an apparatus for use in assembling parts of insole units, a support for the parts to be assembled, a pair of positioning jaws to engage an insole member adjacent to the front end of said support, said positioning jaws having slotted extensions in overlapping relation to each other, a coupling pin member slidable in the slots of said extensions, a member to secure the coupling pin member to one of said extensions thereby to maintain a predetermined setting of the positioning jaws relatively to each other, a bracket rigid with one of said positioning jaws, and a scale and a pointer both mounted on said bracket and with the pointer connected to said coupling pin member, whereby a predetermined setting of the coupling jaws with respect to each other may be duplicated through said pointer, thereby to obtain a certain ratio of movement of the positioning jaws with respect to each other in positioning parts of an insole unit.

7. In an apparatus for use in assembling parts of insole units, a support for the parts to be assembled, a pair of positioning jaws arranged to engage opposite edges of the heel end portion of an insole member, said jaws having connections to cause equal and opposite movements of the said jaws, a pair of longer positioning jaws to engage opposite edges of an insole member adjacent to the front end of said support, and a slidable connection between the longer positioning jaws adjustable to cause a change in the ratio of movement of the jaws with respect to each other in their operative movements to engage the edges of an insole member.

8. In an apparatus for use in assembling parts of insole units, a support for the parts to be assembled, a pair of positioning jaws arranged to engage the heel end portion of an insole member, said jaws having toothed segments to cause equal and opposite movements of the said jaws, a pair of longer positioning jaws to engage an insole member adjacent the front end of said support, said longer positioning jaws having slotted extensions in overlapping relation to each other, a coupling pin member slidable in the slots of said extensions to cause a change in the ratio of movement of the jaws with respect to each other, and a member to secure the coupling pin member to one of said extensions thereby to maintain a predetermined setting of the positioning jaws relatively to each other.

9. In apparatus for use in assembling shoe parts, a support for a shoe part, means for locating the shoe part relatively to said support, said means comprising two gage members, said gage members being located at opposite sides of said shoe part and being movable toward each other to engage said part, a spring connected at its ends to said gage members and tending constantly to move them toward each other to engage yieldingly opposite edges of the shoe part, and operative connections between said gage members constructed and arranged to constrain said members to move toward each other simultaneously, said connections being adjustable to vary the ratio of said movements.

JOHN M. WHELTON.